S. LAKE.
TORPEDO LAUNCHING DEVICE.
APPLICATION FILED NOV. 13, 1907.
925,707.
Patented June 22, 1909.
6 SHEETS—SHEET 1.
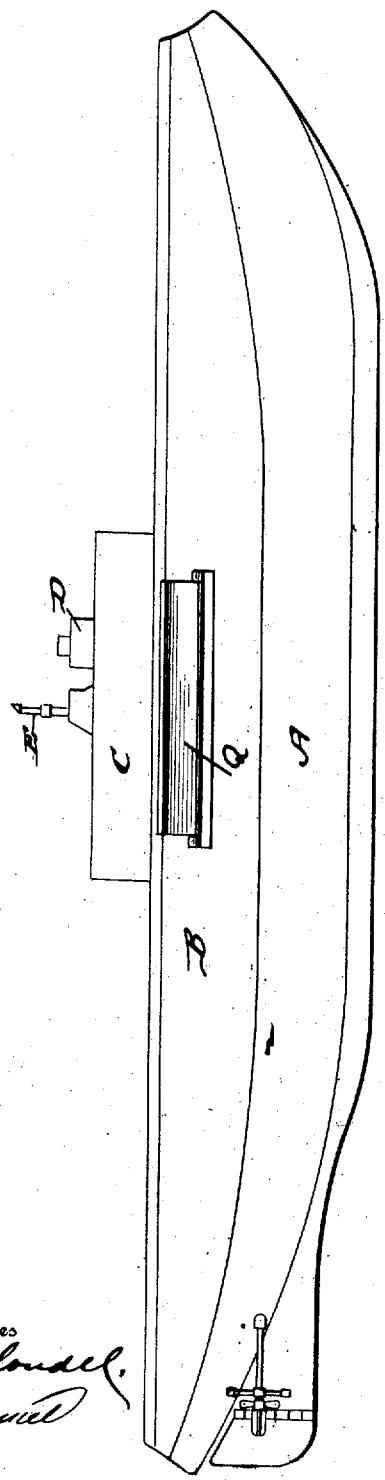
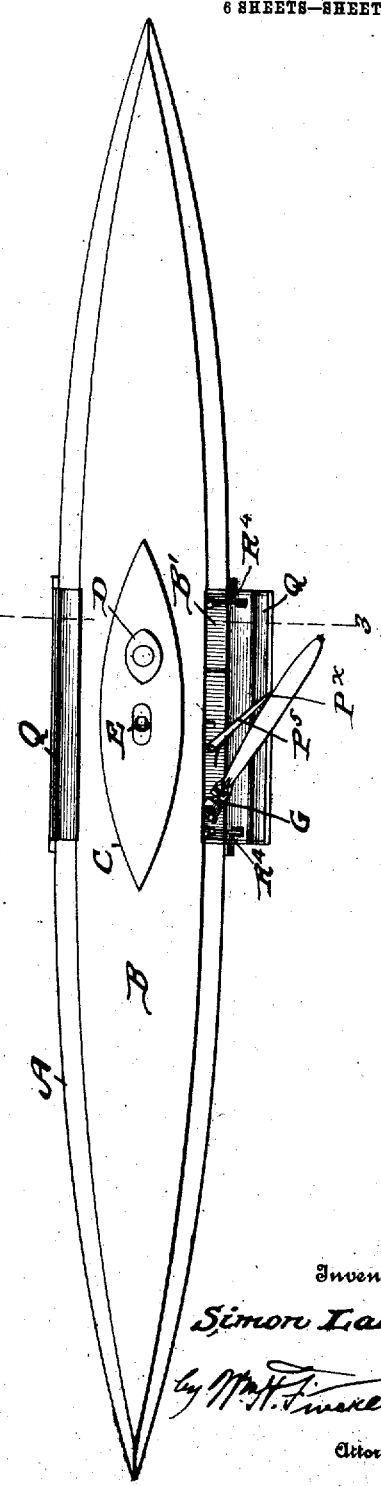
Witnesses
Inventor
Simon Lake.
Attorney S. LAKE.
TORPEDO LAUNCHING DEVICE.
APPLICATION FILED NOV. 13, 1907.
925,707.
Patented June 22, 1909.
6 SHEETS—SHEET 2.
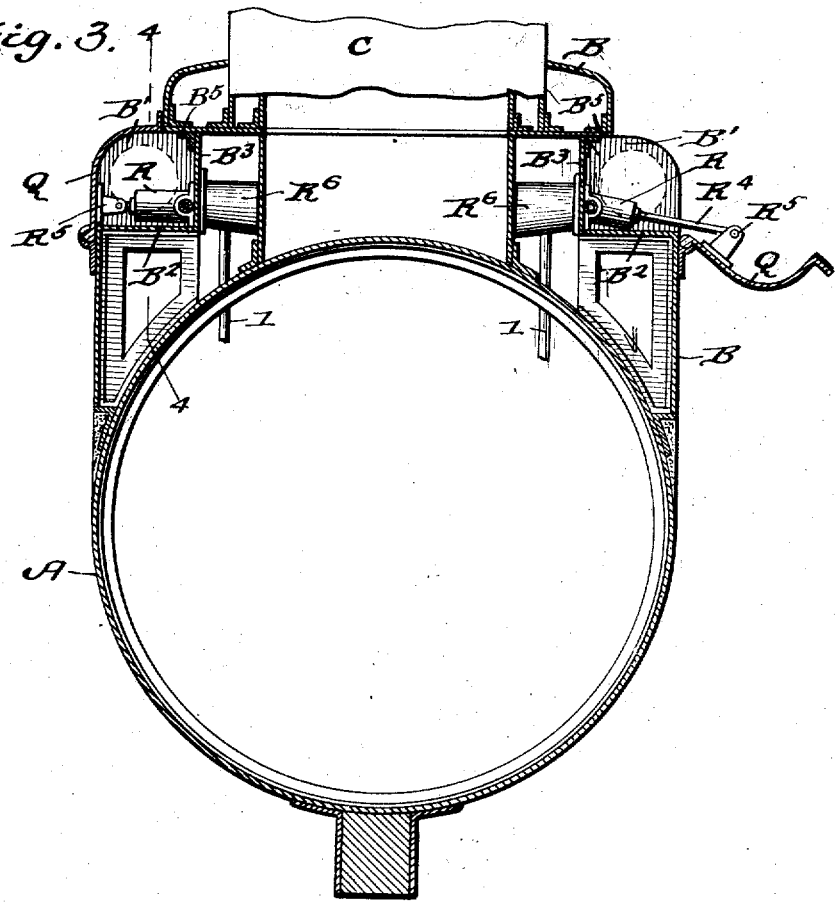
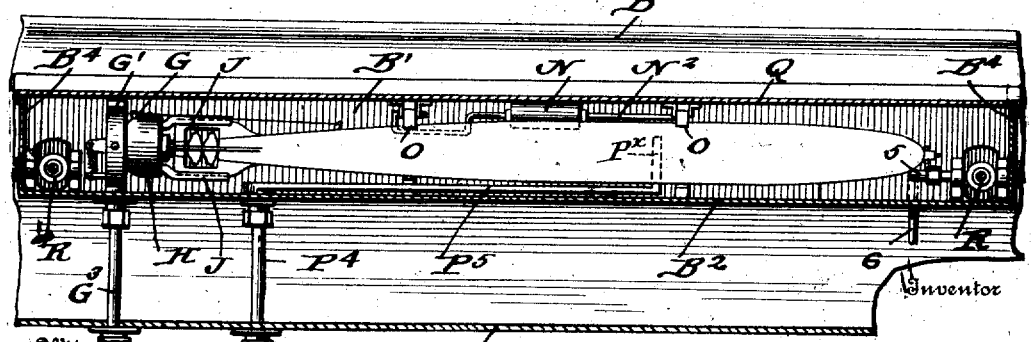

S. LAKE.
TORPEDO LAUNCHING DEVICE.
APPLICATION FILED NOV. 13, 1907.
925,707.
Patented June 22, 1909.
6 SHEETS—SHEET 3.
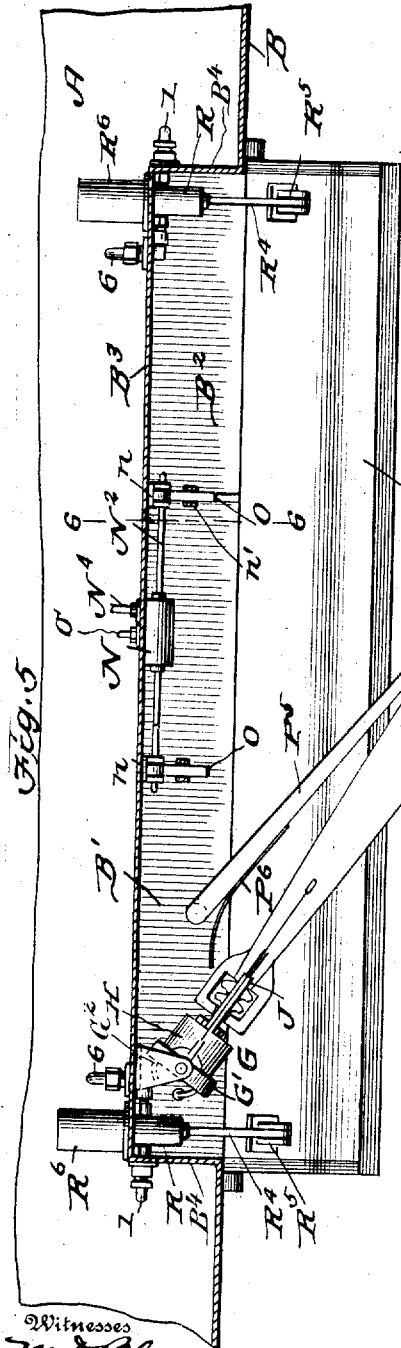
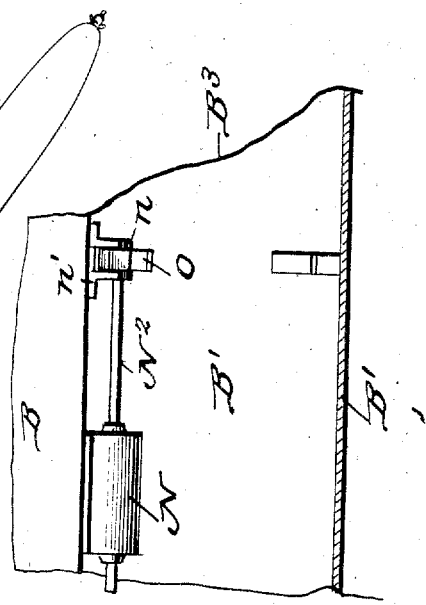
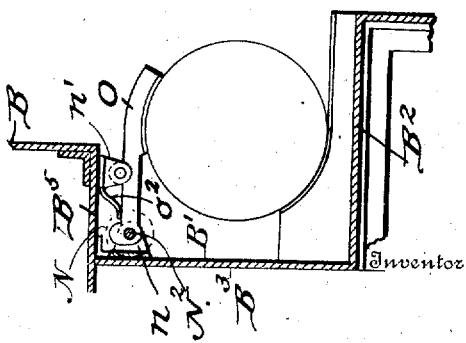
Witnesses
M. D. Blondel.
E. W. Fincuel
Inventor
Simon Lake.
by W. W. Fincuel
Attorney

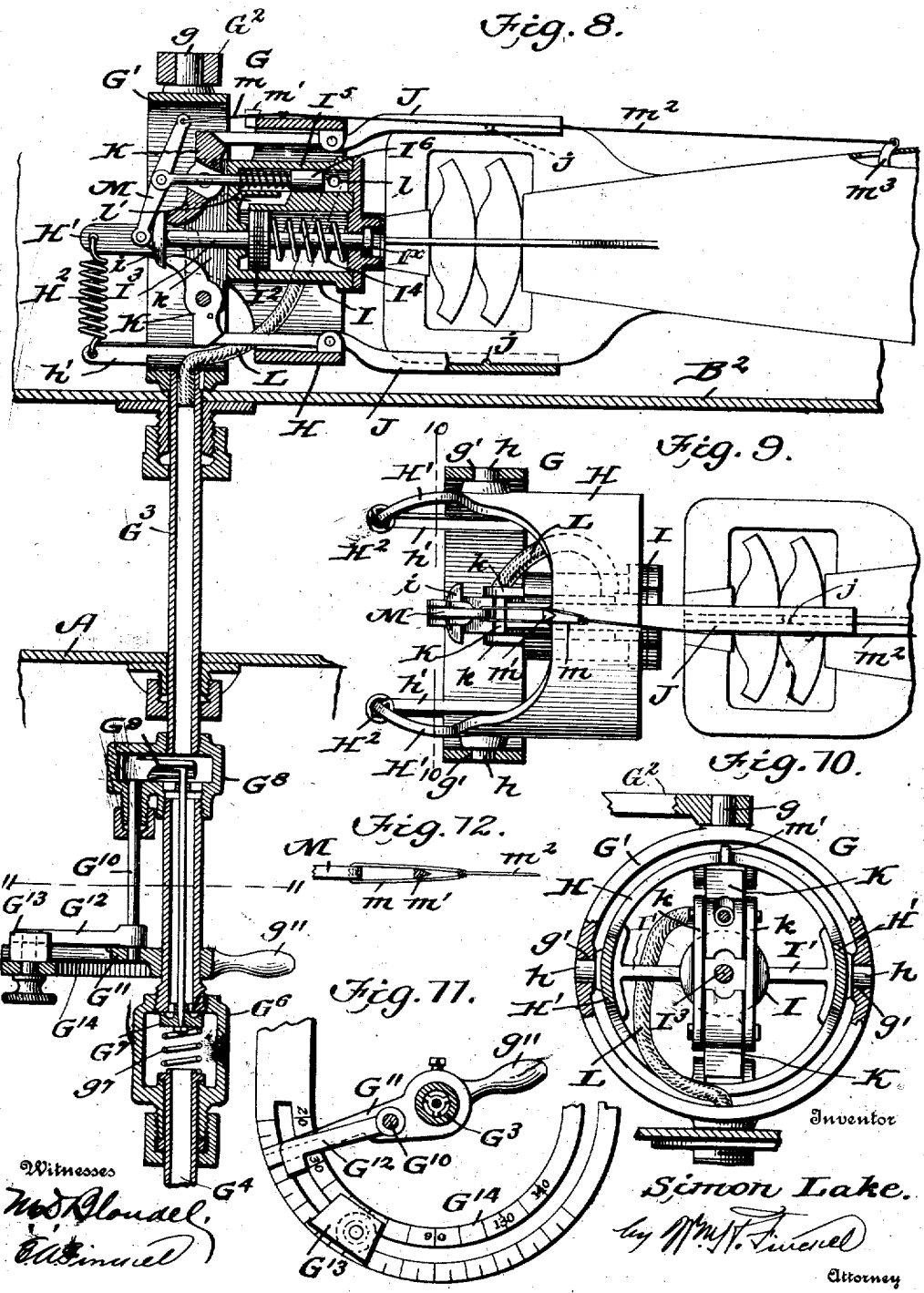

S. LAKE.
TORPEDO LAUNCHING DEVICE.
APPLICATION FILED NOV. 13, 1907.
925,707.
Patented June 22, 1909.
6 SHEETS—SHEET 5.
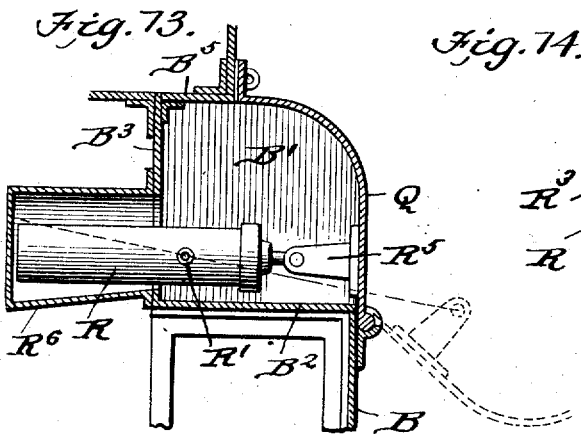
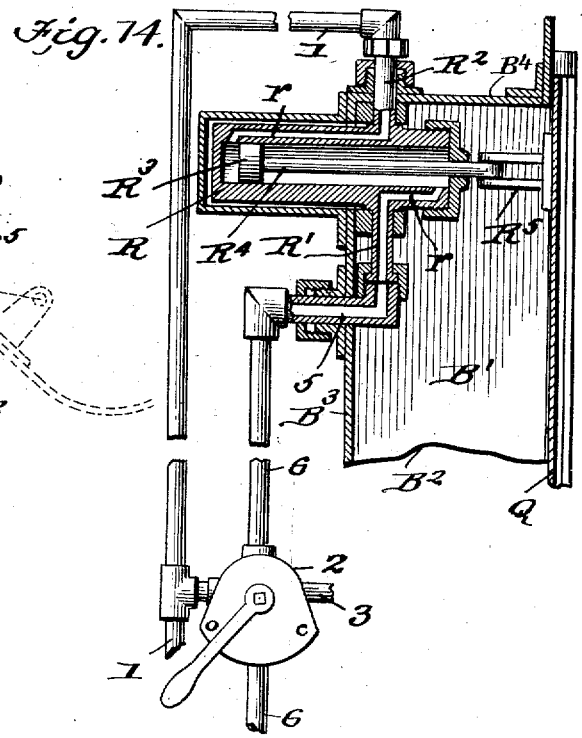
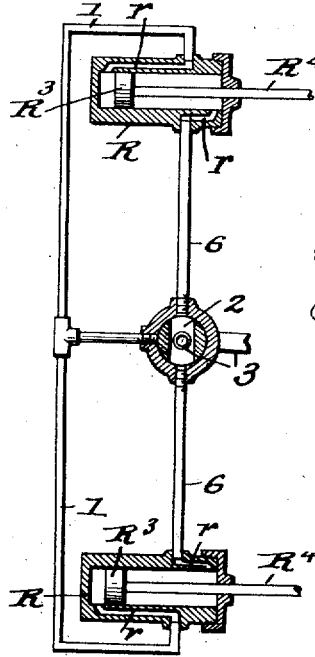
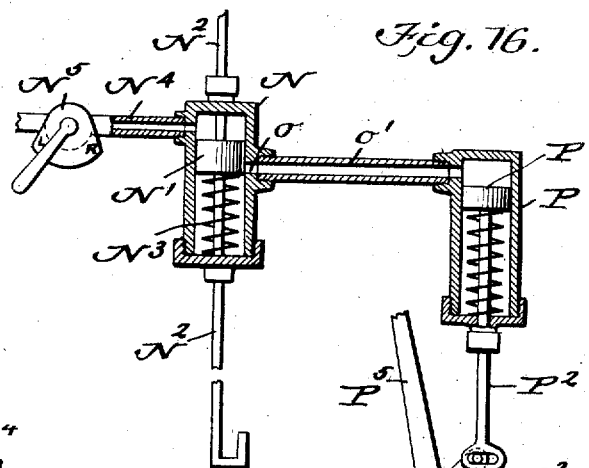
Witnesses
Inventor
Simon Lake.
Attorney S. LAKE.
TORPEDO LAUNCHING DEVICE.
APPLICATION FILED NOV. 13, 1907.
925,707. Patented June 22, 1909.
6 SHEETS—SHEET 6.
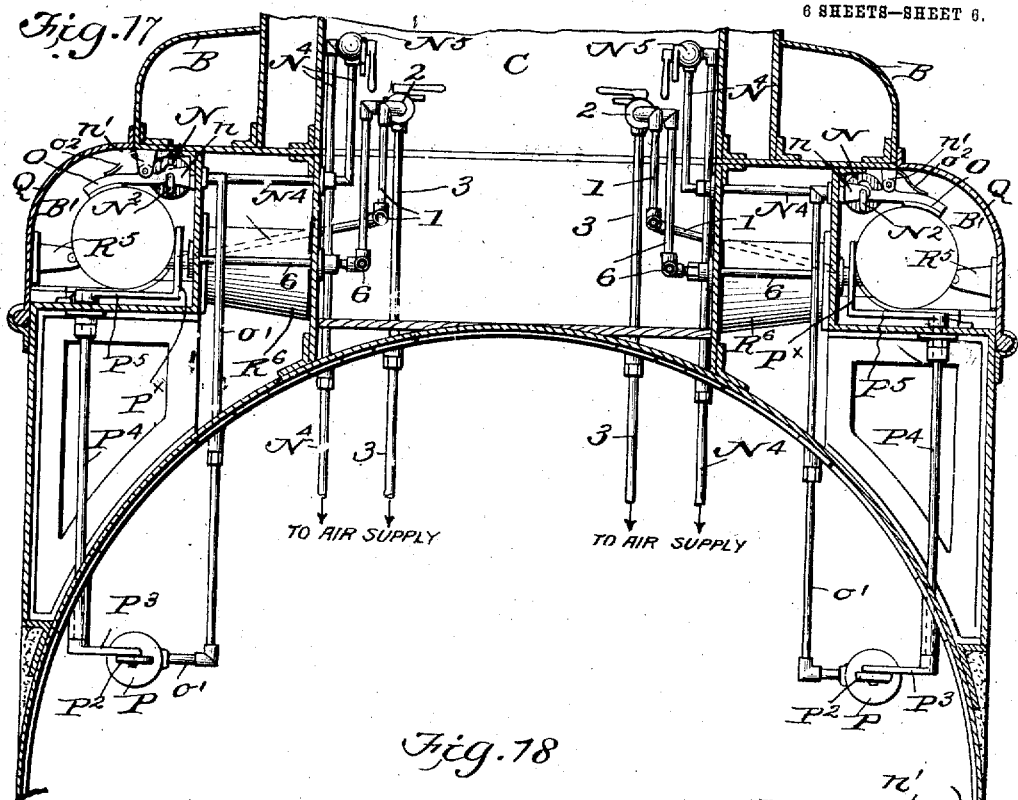
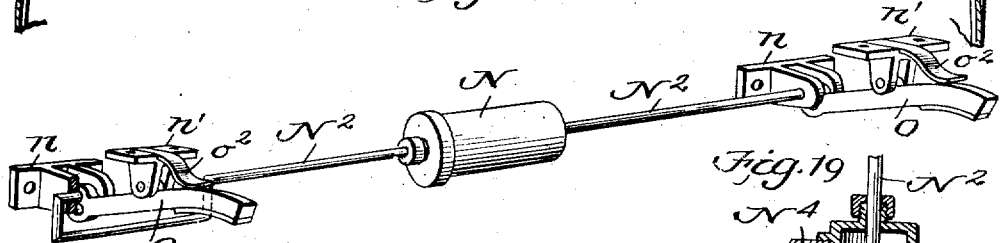
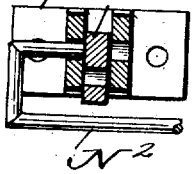
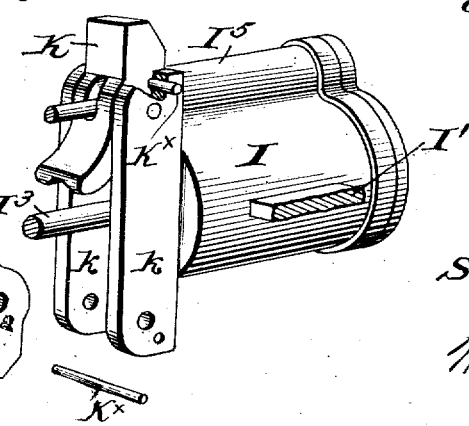
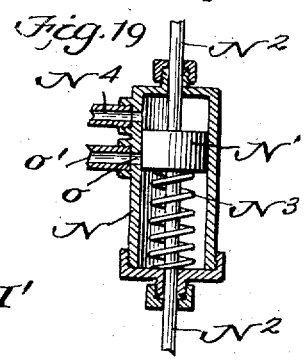
Inventor
Simon Lake.

UNITED STATES PATENT OFFICE.

SIMON LAKE, OF BRIDGEPORT, CONNECTICUT.

TORPEDO-LAUNCHING DEVICE.

No. 925,707.        Specification of Letters Patent.        Patented June 22, 1909.

Application filed November 13, 1907. Serial No. 402,026.

*To all whom it may concern:*

Be it known that I, SIMON LAKE, a citizen of the United States, and a resident of Bridgeport, in the county of Fairfield and State of Connecticut, temporarily residing in London, England, have invented a certain new and useful Improvement in Torpedo-Launching Devices, of which the following is a specification.

The object of this invention is to provide an arrangement for automatically launching automobile or self-propelling torpedoes in any desired direction from a submarine or submergible vessel while the vessel is running either wholly or partially submerged.

The invention consists in constructing the vessel with any number of recesses, in each of which is arranged a combined supporting and launching mechanism that is designed to engage and hold the tail or fins of the torpedo, and which is capable of being turned horizontally on a vertical axis so as to launch the torpedo in any direction from the side of the vessel, the said mechanism being so constructed that when the forward or nose end of the torpedo is swung outwardly from its recess the propelling mechanism of the torpedo will be first set in motion and then the torpedo released from the support and finally given an outward push from the support which will drive it away from the vessel, whence its run will be continued under its own propeller. By this arrangement there is avoided all possible danger of the torpedo coming into contact with the vessel from which it is discharged in case the propelling mechanism of the torpedo should fail to work, so that the vessel may continue its course without danger of any part thereof coming into contact with the torpedo, or deflecting the course, or being affected by the premature discharge of the torpedo.

The invention further consists in providing a door for closing each recess water-tight, and means for opening and closing each door from the interior of the vessel, means for holding the torpedoes in the recesses and releasing them after the doors have been opened and water allowed to enter and surround the torpedoes, and means for pushing the torpedoes out of the recesses, which last mentioned means serve to automatically start the operating mechanism of the torpedoes and also to actuate mechanism for releasing and ejecting the torpedoes from their supports.

The invention further comprises an arrangement by which the mechanism above stated may be set to automatically operate upon the torpedo directly the latter has moved through a predetermined angle when swung from its recess.

The method of launching torpedoes in most submarine boats necessitates the employment of an expulsion tube which is arranged within and projects at one end through the vessel and is closed by an outboard cap which is operated from within the vessel to open the tube prior to the discharge of the torpedo. This method is objectionable in many ways, principally owing to the difficulty of loading the torpedoes into the tubes, especially should the tubes open below the surface of the water, as it requires very careful handling and a special apparatus for the purpose, and also as the torpedoes are inaccessible for the purpose of examination and so forth which is necessary, especially after they have been installed in the tubes for any considerable length of time. In later constructions of launching devices the torpedoes have been suspended in frames which are supported exteriorly of and upon the sides of the hull of the vessel, parts of the frames being swung outwardly prior to the discharge of the torpedoes so as to direct the latter in any desired angle from the vessel. In these constructions the frame work and discharging apparatus are constantly exposed and are objectionable especially in submarine boats as the gear is liable to damage from sea-weeds, hidden objects and so forth, and in addition are difficult to keep in working order as the parts are liable to become strained in a heavy sea-way and therefore rendered inoperable. By my invention, these objections are overcome as will be clearly understood from the following description of my said invention and the accompanying drawings illustrating the same, throughout which drawings like parts are similarly designated.

Figure 1 is a side elevation of a submarine or submergible vessel illustrating the position of the pockets or recesses. Fig. 2 is a plan view of the same showing one of the doors open and one of the torpedoes in position prior to its being launched. Fig. 3 is a vertical transverse section drawn on the line 3—3 of Fig. 2, on a larger scale. Fig. 4 is a detail vertical longitudinal section drawn on the line 4—4 of Fig. 3. Fig. 5 is a horizontal section through one of the pockets or recesses of the vessel and adjacent parts illustrating the torpedo in position to be launched. Fig. 6 is a detail section drawn on the line 6—6 of Fig. 5, on a larger scale. Fig. 7 is a detail face view of the part shown in Fig. 6. Fig. 8 is a detail vertical longitudinal section, on a larger scale, drawn through the support for the torpedo and the mechanism carried thereby for automatically releasing and launching the torpedo. Fig. 9 is a plan view of parts of the mechanism shown in Fig. 8. Fig. 10 is a vertical cross-sectional view drawn on the line 10—10 of Fig. 9. Fig. 11 is a detail sectional plan view drawn on the line 11—11 of Fig. 8. Fig. 12 is a detail plan view illustrating the knife blade for severing the wire connecting the propelling mechanism of the torpedo. Fig. 13 is a transverse section drawn through one of the pockets and one of the cylinders for opening and closing the door. Fig. 14 is a longitudinal horizontal section of some of the parts shown in Fig. 13 showing the valve for controlling the admission of air to the cylinder for operating the doors. Fig. 15 is a diagrammatic view illustrating the cylinders arranged in each end of the recess and the valve employed for controlling the admission of air to either end of the cylinders to open or close the door. Fig. 16 is a diagrammatic sectional view illustrating the arrangement for releasing the torpedo and swinging it outward from the recess. Fig. 17 illustrates diagrammatically in approximate cross-section the arrangement by which the air or other motive fluid is supplied for operating the device. Fig. 18 is a detached perspective view illustrating in part the mechanism for locking and releasing the torpedo. Fig. 19 is a sectional elevation of the operating cylinder shown in Fig. 18. Fig. 20 is a detail plan view, partly in section, of part of the releasing mechanism. Fig. 21 is a perspective view illustrating the torpedo releasing mechanism.

In the drawings A designates the hull of the submarine or submergible vessel, having a superstructure B, navigating turret C, conning tower D and sighting instrument E.

At the upper edges, and preferably amidship the superstructure is provided with recesses or pockets B', B' which are constructed of bottom plates B², vertical walls B³ which form the backs of the recesses, end sections B³, B⁴, and top portions B⁵ all of which are joined together and to the superstructure by water tight joints.

The recesses or pockets are designed for holding torpedoes, and as the mechanism for supporting and discharging the torpedoes is exactly the same, I will describe the construction of one only.

Mounted in one end of each recess or pocket B' is a support G, Figs. 2, 4, 5 and 8 to 11. This support comprises a gimbal ring G' having a vertically arranged axis, and a band H having a horizontal axis in the gimbal ring, and their adjuncts, as I will now describe. The gimbal ring has a trunnion $g$ extending from its upper side and journaled in a bracket G², Figs. 5, 8 and 10, extending from the back of the recess, and a hollow shaft G³ depending from its lower side in direct vertical alinement with the trunnion and the center of the ring. As shown in Fig. 8, the said shaft is journaled in a stuffing-box applied to the bottom plate of the recess and extends down into the hull of the vessel and is connected to a compressed air supply pipe G⁴ extending from a compressed air tank (not shown) located in the vessel. Apertures $g'$ are formed in the sides of the ring G' at diametrically opposite points in the horizontal plane of the axis of the ring. The cylindrical band H has rearwardly extending arms H' having trunnions $h$ projecting from their outer sides, and these trunnions have bearings in said apertures $g'$ to support the cylindrical band H. Spiral springs H² connect the arms H' with arms $h'$ extending rearwardly from the gimbal ring G' so as to hold the band H in a substantially vertical position and compensate for the weight of the empty band and the parts carried thereby. Since the gimbal ring has a vertical axis, the support is capable of a horizontal axial movement to swing the torpedo outward, and since the band has a horizontal axis in the gimbal ring it may be said that the support also is capable of a vertical axial movement, so that the projected torpedo may rise and fall with the water or vessel. The springs H² serve to hold up the empty band and thus retain it in position to be returned into the recess after a torpedo has been launched.

I designates a cylinder supported centrally within the band H, by arms I' that are formed integral with the cylinder and which are connected to the inner surfaces of the band H. Within the cylinder is a piston I², the rod I³ of which projects through both heads of the cylinder and has its forward end terminating in a flat head I˟ which is designed to butt against the tail of the torpedo when the piston is moved forward in the cylinder so as to push the torpedo from its support when released, and thus serves as an initial propeller auxiliary to the torpedo's propeller for starting the torpedo on its way.

Pivotally connected to the band H are clamping arms J, J, arranged at diametrically opposite points in the vertical plane of the axis of the band. These clamping arms are pivoted between their ends. The inner surfaces of the forward portions of said clamping arms are grooved to fit the vertical fins of the tail of the torpedo and extend substantially the full length of the fins.

Extending across the grooves of the arms are lugs $j, j$ which fit recesses formed in the edges of the fins and serve to lock the torpedo in position.

The opposite ends of the clamping arms extend beyond the rear edge of the band H and terminate in inwardly beveled nose portions which are engaged by the outer beveled ends of locking dogs K, K pivoted intermediate their length in ears $k$ projecting from the rear head of the cylinder I and at their opposite ends the dogs are engaged by a head $i$ formed upon the inner end of the piston rod $I^2$. Interposed between the piston and the forward head of the cylinder is a spring $I^4$ to prevent the accidental forward movement of the piston which would disengage the dogs from the clamping arms and thereby release the torpedo.

The ring $G'$ is provided with an aperture which registers with the hollow shaft $G^3$ and extending from the aperture is a flexible pipe or hose section L which extends to and communicates with a port $l$ formed in a cylinder $I^5$ cast integral with the cylinder I and preferably smaller in diameter than the latter cylinder. Operating in the cylinder $I^5$ is a piston $I^6$ the rod of which extends through the rear end of its cylinder and through the upper locking dog K and has its outer end connected to a lever M which is pivotally held at its lower end to the head $i$ of the piston rod $I^2$ and to its opposite end is connected a wire loop $m$ which straddles a knife blade $m'$ arranged upon the rear edge of the band H. To this loop is connected a trip wire $m^2$ whose opposite end is connected to the tripping or starting lever $m^3$ controlling the propelling mechanism of the torpedo. Between the cylinders the casting is provided with a port $l'$ the inlet end of which is closed by the piston $I^6$ when the latter is in its normal position, and its outlet end is arranged adjacent to the rear head of the cylinder and back of the piston $I^2$, so that when air is admitted to the cylinder I the piston will be moved forwardly to bring the head at the forward end of the rod into engagement with the tail of the torpedo as will be fully set forth in the description of the operation of the device.

As before stated, the inner end of the shaft $G^3$ extends through the hull of the vessel and is connected to a valve casing $G^6$ which is swiveled to the air supply pipe $G^{10}$. A valve $G^9$ is arranged in the casing and is normally held to its seat by a spring $g^7$ as shown. The stem of the valve extends upwardly through a section of the shaft and projects into a casing $G^8$ interposed in the shaft and its upper end is engaged by the lower beveled surface of an oscillating arm $G^9$ on the upper end of a rock shaft $G^{10}$ which extends into the casing and is journaled in a stuffing box projecting from the casing, and at its lower end in an arm $G^{11}$ secured to the shaft. A trip lever $G^{12}$ is secured to the rock shaft adjacent to its lower end, and at its outer end said trip-lever is provided with a contacting nose portion which projects over the side of the arm $G^{11}$ and is adapted for engagement with a contact block $G^{13}$ adjustably carried by a quadrant $G^{14}$ surrounding the lower end of the shaft and secured to the hull of the vessel. The quadrant is provided with a scale ranging from 20 degrees to 140 degrees and the contact block is designed to be set so as to discharge the torpedo at any point directly the latter has moved through a predetermined angle. The quadrant is provided with a slot through which extends a clamping screw carried by the block $G^{13}$ by which the block may be clamped at any point upon the quadrant.

Referring to Figs. 4, 5, 6, 7 and 16, there is arranged in the upper inner corner of each recess B' a cylinder N having a piston N' operating therein, the rod $N^2$ of which projects through both heads of the cylinder and has its ends operating through perforated ears or lugs $n$ Fig. 5, depending from the top of the recess, and also operating through the rear perforated ends of locking arms O, Fig. 6, which are pivoted intermediate their ends between ears $n'$ depending from said top adjacent to its outer edge. The forward ends of the locking arms O are concave upon their lower surfaces and snugly fit the body of the torpedo. One end of the rod $N^2$ is bent back upon itself to provide a short hook, Fig. 16, the end of which extends through the adjacent lug and levers from the side opposite the piston thereby permitting the withdrawal of the ends of the rod from the lugs to release the locking arms at one movement of the piston.

The piston is normally held at one end of the cylinder by a spring $N^3$ and is moved to the opposite end by means of compressed air conducted through a port adjacent to the end of the cylinder and a pipe $N^4$ connected thereto which extends from a suitable supply tank (not shown) arranged within the vessel. A valve $N^5$ controls the admission of air to the cylinder and the casing is provided with an extension upon which are stamped the letters "L" and "R" designating respectively "locked" and "released", and which indicate to the attendant the condition of the locking arms. It will be readily understood that when the valve lever is thrown from one position to the other the piston will be moved within the cylinder to lock or release the locking arms. When the piston is held under tension of the spring $N^3$ as in Fig. 16, it covers an exhaust port $o$ in the cylinder, and this exhaust port opens into a pipe $o'$ which is connected to one end of a cylinder P in which operates a piston $P'$ whose rod $P^2$ has its outer end transversely slotted to receive a pin carried at the outer end of a crank arm $P^3$ projecting from a rock shaft $P^4$, Fig. 4, journaled in and projecting through the bottom $B^2$ of the recess and which carries an arm $P^5$ at its upper end whose free end has an upright portion $P^x$ which normally engages the body of the torpedo forward of its center and serves to push or swing the torpedo outwardly prior to its being released and launched. A flat spring $P^6$ serves to return the arm $P^5$ to its normal position. By this arrangement it will be readily seen that as the valve $N^5$ is operated to admit air to the cylinder N the locking arms O will be first released and by the movement of the piston the port $o$ will be uncovered when the air will pass into the cylinder P and operating upon the piston $P'$ will cause the rock-shaft $P^x$ to rock and the arm $P^5$ to swing around and push or swing the forward end of the torpedo out of the recess. The inner ends of the locking arms are forced downwardly by means of springs $o^2$, and their extreme ends are provided with upward extensions which are designed to close the apertures in the lugs $n$ to prevent the spring $N^3$ pushing the piston and rod forwardly when the port $o$ is uncovered and the pressure in the cylinder is reduced, thereby assuring a free passage of air to the cylinder P the piston of which operates to swing the torpedo out of the recess.

Hinged to the sides of the superstructure at the lower edge of each recess B' is a door Q which is designed to close the recess B' and each has its edges lined with rubber or other suitable material to render the recess water tight. In order to open and close the doors I employ the following mechanism:

Journaled in each end of each recess is a cylinder R in the sides of which are arranged ports $r, r$ that extend in opposite directions to the opposite ends of the cylinders and communicate with the inner ends of hollow trunnions R' and $R^3$. The trunnion $R^2$ of each cylinder projects through the adjacent end wall of the recess and is swiveled to the end of a compressed air supply pipe 1 extending from a two-way valve 2 to which is connected a supply pipe 3 extending from a compressed air tank (not shown) arranged in the hull of the vessel. The opposite trunnion R' of each cylinder is swiveled to one end of an elbow pipe 5 which projects through the bottom or back of the recess, and its opposite end is connected by a pipe 6 with a port of the two-way valve 2. Working in the cylinders are pistons $R^3$ the rods $R^4$ of which extend through the outer ends of the cylinders and are pivotally connected at their extreme ends to brackets $R^5$ extending from the door Q. By this arrangement a single valve 2 may be used to control both cylinders in each recess to raise or lower the door. The rear ends of the cylinders extend through openings formed in the back of the recess and are incased in a housing $R^6$. The valve 2 is arranged within the vessel at any convenient place to be within easy reach of the operator and in order to enable the operator to determine the position of the door, I provide the valve casing with an extension upon which is stamped the letters "O" and "C" designating "Open" and "Closed."

The operation of the mechanism in each recess is as follows: The torpedo is lowered into the recess and locked in position by the locking arms O, the tail is securely clamped between the arms J, J and the tripping or starting or releasing lever $m^3$ of the torpedo is connected to the lever M by means of the wire $m^2$ as shown. The door Q is then securely fastened in its closed position. When the enemy is sighted and it is desired to discharge the torpedo from either side of the vessel, the valve 2 is turned to admit air into the rear ends of the cylinders R which will push out their pistons and swing the door upon its hinges to its open position. Immediately the door is opened water enters the recess and surrounds the torpedo which, however, is held in position by means of the arms O. When the most advantageous point from which to discharge the torpedo is reached, the valve $N^5$ is opened to admit air to the cylinder N to first release the locking arms O, and immediately after the levers are released the port $o'$ will be uncovered to admit air to the cylinder P and thereby operate its piston and thereby the rock-shaft $P^4$ and so move the arm $P^5$ to swing the forward end of the torpedo outwardly from the vessel. Prior to this operation the tripping block $G^{13}$ has been properly set upon the quadrant, and as the shaft $G^3$ of the support is swung around by the movement of the torpedo, the tripping lever $G^{12}$ is brought into engagement with the tripping block and the valve $G^7$ will be opened and air will immediately rush through the shaft and flexible hose section into the cylinder $I^5$ which will actuate the piston $I^6$ and through it the lever M, wire $m^2$ and the starting mechanism $m^3$ of the torpedo and start the propellers, after which one end of the loop of the wire is brought into engagement with the knife blade $m'$ which severs the wire and frees that end carried by the torpedo. Immediately the piston $I^6$ has opened the inlet end of the port of the passageway $l'$, air will rush into the rear end of the cylinder I and project its piston $I^2$, thereby actuating the locking dogs to release the clamping levers J, and by a continued movement of the piston head I^ at its forward end will strike the torpedo and forcibly expel or discharge it from the support and away from the vessel, when it will continue its progress under its own propulsive medium.

When the torpedo has been discharged the attendant grasps the handle $g''$ of the shaft $G^3$ and turns the support back into its recess $B'$, the valve 2 is then reversed to conduct the compressed air to the forward ends of the cylinders R which will move the pistons to the opposite ends of the cylinders and close the doors.

In order to prevent accidental displacement of the locking dogs K, K, and to hold them in engagement with the levers J, J, I provide the dogs K and ears $k$ with registering apertures to receive wooden pins $K^\times$, Fig. 21, which will lock the dogs in position, but which, by the movement of the piston $I^2$ will be severed or broken and the edges allowed to be pushed from engagement with the levers.

What I claim is:

1. A torpedo launching apparatus, comprising a support adapted to hold the torpedo by its tail and arranged to permit vertical and horizontal movements of the torpedo while engaged by the support, means for swinging the torpedo and support horizontally upon the vertical axis of the support, and means actuated by the swinging movement of the support for releasing the torpedo, and means similarly actuated and auxiliary to the torpedo's propeller for ejecting it from the said support.

2. A torpedo launching apparatus, comprising a support adapted to hold the torpedo by its tail and arranged to permit vertical and horizontal movements of the torpedo while so held, means to side-hold the torpedo in its support against horizontal swinging movement, means for releasing the side-hold on the torpedo and swinging it and its support horizontally upon the vertical axis of the support, means actuated by the swinging movement of the support for releasing the torpedo from the support, and means similarly actuated and auxiliary to the torpedo's propeller for ejecting it from the support.

3. A torpedo launching apparatus, comprising a support adapted to hold the torpedo by its tail and arranged to permit vertical and horizontal movements of the torpedo while so held, means to side-hold the torpedo in its support against horizontal swinging movement, means for releasing the side-hold on the torpedo and swinging it and its support horizontally upon the vertical axis of the support, means actuated by the swinging movement of the support for releasing the torpedo from the support, means similarly actuated and auxiliary to the torpedo's propeller for ejecting it from the support, and means for effecting the release at any predetermined angle of the horizontal movement.

4. A torpedo launching apparatus, comprising a support engaging the rear end of the torpedo and adapted to permit vertical and horizontal movements of the torpedo, means for swinging the support and the forward end of the torpedo horizontally upon the vertical axis of the support, means for automatically releasing the torpedo from the support operating directly the torpedo has moved through a predetermined angle, and automatic means similarly actuated and auxiliary to the torpedo's propeller for ejecting the torpedo from its support.

5. A torpedo launching apparatus, comprising a support having vertical and horizontal axes, means carried by the support for holding the tail of the torpedo, means for swinging the forward end of the torpedo and the support upon the vertical axis of the support, means for releasing the torpedo, and means auxiliary to the torpedo's propeller for ejecting the torpedo from the support, both which last-named means acting automatically directly the torpedo has moved through a predetermined angle.

6. A torpedo launching apparatus, comprising a support having vertical and horizontal axes, means carried by the support for engaging the tail of the torpedo, means for swinging the forward end of the torpedo and the support upon the vertical axis of the said support, means for holding the torpedo against such movement, releasing mechanism for such holding means, and means connected with the support for automatically releasing the torpedo and ejecting it from the support directly the torpedo has moved through a predetermined angle.

7. A torpedo launching apparatus, comprising a support adapted to swing horizontally on a vertical axis, means carried by the support for engaging and holding the tail of the torpedo, means carried by the support for first releasing the holding means and then ejecting the torpedo from the support, and means automatically operated by the movement of the support for supplying an operating medium to the releasing and ejecting means.

8. A torpedo launching apparatus, comprising a support having a vertical axis, means carried by the support for holding the tail of the torpedo, means connecting the starting lever of the torpedo propelling mechanism with the support, and a series of means automatically operated by the axial movement of the support for first operating the starting lever, then releasing the holding means for the torpedo and finally ejecting the torpedo from the support.

9. A torpedo launching apparatus, comprising a support having vertical and horizontal axes, means carried by the support for engagement with the tail of the torpedo, means for swinging the forward end of the torpedo and the support upon the vertical axis of the said support, means for releasing the holding means and ejecting the torpedo from the support, and means set in motion by the horizontal movement of the support for supplying a power medium to the releasing and ejecting means.

10. A torpedo launching apparatus, comprising a support having vertical and horizontal axes, means for holding the tail of the torpedo in the support, means for swinging the torpedo outwardly upon the vertical axis of the said support, and a coöperating series of means operable through the said torpedo swinging means first to release the propelling mechanism of the torpedo, then to release the holding means, and finally to eject the torpedo from the support when the latter has moved through a predetermined angle.

11. A torpedo launching apparatus, comprising a support having vertical and horizontal axes, means for holding the tail of the torpedo in the support, means for swinging the torpedo outwardly upon the vertical axis of the said support, a coöperating series of means operable through the said torpedo swinging means first to release the propelling mechanism of the torpedo, then to release the holding means, and finally to eject the torpedo from the support when the latter has moved through a predetermined angle, and means for determining the point at which the aforesaid operations upon the torpedo take place.

12. A torpedo launching apparatus, comprising a support, clamping arms carried thereby and adapted to engage the vertical fins of the tail of the torpedo, means for swinging the forward end of the torpedo in a horizontal plane through a predetermined angle, pneumatically operating means for releasing and ejecting the torpedo from the support when the torpedo has reached a certain point of its movement, and means for determining the point at which the torpedo is released and launched.

13. A torpedo launching apparatus, comprising a support having clamping arms pivotally connected thereto and adapted to hold the torpedo in the support, means for holding the arms in engagement with the torpedo, pneumatically operated means for swinging the torpedo outwardly in a horizontal direction, and means operable from the movement of the torpedo swinging means for controlling an operating medium to release the clamping arms and forcibly eject the torpedo from the support.

14. A torpedo launching apparatus, comprising a support having vertical and horizontal axes, clamping arms carried by the support for engaging the tail of the torpedo, means for holding the arms in their engaged position, pneumatically operated means for swinging the torpedo outwardly in a horizontal plane upon the vertical axis of the support, and pneumatically operated means for releasing the arms and forcibly ejecting the torpedo from the support, said torpedo swinging means by its movement serving also to control the supply of the operating medium to the means for releasing the arms and ejecting the torpedo from the support.

15. The combination with a vessel, of a support for holding a torpedo, means for swinging the torpedo outwardly in a horizontal plane, automatically operated means auxiliary to the torpedo's propeller for forcibly ejecting the torpedo from the support directly the said torpedo has been moved through a predetermined angle, and means for governing the point so as to expel the torpedo in a given direction.

16. The combination with a vessel, having a recess or pocket in the side thereof, of a support journaled in the pocket and adapted for holding the tail of a torpedo, means for swinging a torpedo outwardly and turning the support upon its axis, and means operable through and by the movement of the means for swinging the torpedo and support to release the torpedo and including mechanism carried by the vessel and independent of the torpedo's propeller to eject said torpedo from the support.

17. The combination with a torpedo boat, having a recess in the side thereof, of a closure for the recess, means for opening and closing the closure, a support journaled in the end of the recess adapted for holding one end of a torpedo, means for transversely holding the torpedo within the recess, means for releasing the holding means, means for swinging the torpedo outwardly upon the axis of the support, and means for releasing and forcibly ejecting the torpedo from the support directly the torpedo has moved through a predetermined angle.

18. The combination with a submergible vessel, having a recess in the side thereof, of a support having vertical and horizontal axes and adapted for holding the end of a torpedo, arms pivoted within the recess for transversely holding the torpedo therein, means for operating said arms to release the torpedo, means for swinging the free end of the torpedo out of the recess in a horizontal plane, and means operable through the movement of the support imparted by the torpedo for releasing and forcibly ejecting the torpedo from the said support.

19. The combination with a submergible vessel, having a recess or pocket in the side thereof, of a gimbal ring journaled in one end thereof and adapted to rotate upon a vertical axis, a band journaled horizontally in the gimbal ring, means carried by the band for holding the end of a torpedo, means for swinging the free end of the torpedo out of the recess upon the vertical axis of the gimbal ring, means independent of the torpedo and operable through the torpedo swinging means to release and forcibly eject the torpedo from the vessel, a closure for the said recess, and means for opening the closure prior to the operations upon the torpedo.

20. The combination with a submergible vessel, having a recess in the side thereof, of a support adapted to swing horizontally on a vertical axis, arms carried by the support to engage the tail of a torpedo, arms to engage the body of the torpedo to hold the torpedo laterally within the recess, means for releasing the lateral holding arms, means for swinging the torpedo out of the recess, and means for releasing the tail holding arms and including mechanism for pushing the torpedo from the support.

21. The combination with a submergible vessel, having a recess or pocket in the side thereof and opening outward through the hull of the vessel and which is adapted to hold a torpedo, of a support journaled in one end of the recess for engagement with the tail of the torpedo, clamping arms for holding the torpedo in the support, means for locking the arms in their clamped position, means for turning the support upon its journal and swinging the torpedo out of the recess, means for releasing the locking means of the clamping arms when the torpedo has moved through a predetermined angle, and means auxiliary to the torpedo's propeller for ejecting said torpedo.

22. The combination with a submergible vessel, having a recess or pocket in the side thereof and opening outward through the hull of the vessel and which is adapted to hold a torpedo, of a support journaled in one end of the recess for engagement with the tail of the torpedo, clamping arms for holding the torpedo in the support, means for locking the arms in their clamped position, means for turning the support upon its journal and swinging the torpedo out of the recess, means for releasing the locking means of the clamping arms when the torpedo has been moved through a predetermined angle, means for adjusting this angle according to the direction to be given to the torpedo, and means auxiliary to the torpedo's propeller for forcibly ejecting the torpedo from its support.

23. The combination with a submergible vessel, having a recess or pocket in the side thereof which is adapted for holding a torpedo, of arms pivoted within the recess for engagement with the body of the torpedo to hold it in position when the vessel is submerged, a support arranged at one end of the recess and having vertical and horizontal axes, clamping arms carried by the support and engaging the tail of the torpedo, dogs for holding the arms in engagement with the torpedo, pneumatically operated means for swinging the torpedo outwardly from the recess upon the vertical axis of the support, pneumatically operated means for engagement with the dogs to release the clamping arms and for ejecting the torpedo from the vessel, said means being automatically operated through the movement of the support on its vertical axis, and means for determining the point of release.

24. The combination with a submergible vessel, having a recess in the side thereof which is adapted for holding a torpedo, of a door hinged to the lower edge of the recess for opening and closing the said recess, arms for engagement with the body of the torpedo to hold it in position when the vessel is submerged and the door is opened, clamping arms for engagement with the tail of the torpedo, a band to which the clamping arms are pivoted, a gimbal ring adapted for horizontal movement upon a vertical axis and to which the said band is journaled, means for holding the clamping arms in position, a cylinder having a piston whose rod is adapted to engage the locking means of the clamping arms and the tail of the torpedo, and means for swinging the torpedo out of the recess and whose movement automatically admits an operating medium to the piston to release the clamping arms and eject the torpedo from the vessel when the said torpedo has been moved through a predetermined angle.

25. The combination with a submergible vessel, having a recess in the side thereof, of a door for the recess, means controlled from within the vessel to open and close the door, arms for holding a torpedo within the recess in position when the vessel is submerged and the door is opened, means for moving the torpedo out of the recess when the arms are released, a support for the tail end of the torpedo, and means carried by the support and operable through the movement of the torpedo for releasing the hold upon the tail of the torpedo and ejecting it from the vessel when the torpedo has been moved through a predetermined angle.

26. The combination with a submergible vessel, having a recess in the side thereof adapted for holding a torpedo, of a door for the recess, means for opening and closing the door, means for holding the body of the torpedo in position, a support engaging the tail of the torpedo and adapted for swinging upon a vertical axis, a cylinder carried by the support, a piston operating therein the rod of which extends through the ends of the cylinder, one end of the rod being adapted to engage the torpedo and the other end for engagement with the means to release the torpedo from the support, and pneumatically operated means for moving the torpedo out of the recess when the arms engaging the body thereof have been released, the said torpedo moving means serving to turn the support upon its axis and thereby automatically admit an operating medium to the said cylinder to release and eject the torpedo from the vessel.

27. The combination with a submergible vessel, having a recess in the side thereof, of a door for the recess, means for opening and closing the door, a gimbal ring journaled in one end of the recess upon a vertical axis, a band having a horizontal axis, clamping arms carried by the band and adapted to engage the tail of the torpedo, locking dogs engaging the arms for holding their forward ends in engagement with the torpedo, a cylinder carried by said band and having a piston whose rod projects through both ends of the cylinder and having one end adapted to engage the torpedo and its opposite end to engage the dogs to release the clamping arms, an arm to swing the forward end of the torpedo from the said recess, and means operable through the movement of the gimbal ring to admit the power medium to the cylinder to push the piston forwardly therein to release the arms and eject the torpedo.

28. The combination with a submergible vessel, having a recess in its side, of a door for recess, means for opening and closing the door, a support arranged in one end of the recess and adapted to hold a torpedo, arms engaging the torpedo to hold it in position within the recess when the boat is submerged and the door is opened, means for releasing the arms, means for swinging the torpedo out of the recess and turning the said support, and means actuated by such swinging movement for releasing the torpedo from the support and forcibly ejecting the torpedo from the vessel after the torpedo has been moved through a predetermined angle.

29. The combination with a submergible vessel, having a recess in the side thereof, of a door for the recess, a gimbal ring journaled in one end of the recess and adapted to turn horizontally on a vertical axis, a band journaled in the gimbal ring and adapted to swing vertically upon a horizontal axis, clamping arms pivoted to the band for engagement with the torpedo, locking dogs for engagement with the clamping arms, a cylinder carried by the band and having a piston whose rod projects through both heads of the cylinder, a second cylinder formed integral with the first mentioned cylinder and having a port which opens into the first mentioned cylinder, means for supplying air under pressure to the second mentioned cylinder to operate upon the piston to open the port leading to the first cylinder, means operable by the movement of the piston in the second cylinder for starting the propelling mechanism of the torpedo, means operated by the movement of the gimbal ring for controlling the admission of air to the cylinders, and means for swinging the torpedo out of the recess to turn the said gimbal ring.

30. The combination with a submergible vessel, having a recess or pocket in the side thereof, of a gimbal ring journaled in vertically arranged bearings and adapted to turn thereon, a band journaled in the gimbal ring, a cylinder carried by the band and having a piston whose rod projects through both ends of the cylinder, an arm for swinging the torpedo out of the recess and turning the gimbal ring upon its axis, means for operating the said arm, means for supplying air under pressure to the cylinder, a valve controlling the supply of air, and means operated by the movement of the gimbal ring for opening the valve.

31. The combination with a submergible vessel, having a recess in the side thereof, of a door for the recess, pneumatic pressure cylinders and pistons to open and close the door, pipes for conducting air to each end of the cylinders, a valve for controlling the supply of air to either end of the cylinders, a turning support arranged in the recess and adapted to hold a torpedo, an arm for swinging the torpedo out of the recess upon the axis of the support, means carried by the support to release and project the torpedo from the vessel when the torpedo has been moved through a predetermined angle, and means for automatically supplying the operating medium to the said releasing and projecting means.

32. A submergible vessel having a superstructure, a recess formed in the superstructure, a door for the recess, pneumatic pressure cylinders having pistons and journaled in the ends of the recess upon hollow trunnions which communicate with the opposite ends of the cylinders, pipes connected to the trunnion, a valve for controlling the admission of air to either end of the cylinders, a support arranged upon a vertical axis in the recess for holding the end of a torpedo, means for swinging the torpedo out of the recess upon the axis of the support, and means for releasing and projecting the torpedo from the vessel when the said torpedo has been moved through a predetermined angle.

33. A submergible vessel having a superstructure, a pocket or recess formed in the side thereof, a door for the recess, means for opening and closing the door, an arm arranged in the recess and adapted for engagement with the torpedo, a support for holding the end of the torpedo, a pneumatic pressure cylinder for operating the said arm, a pneumatic pressure cylinder and piston for expelling the torpedo from the support, means for supplying air under pressure to the arm-operating cylinder, and means for automatically admitting air to the torpedo-expelling cylinder.

34. A submergible vessel, having a superstructure, a recess formed in the superstructure, an arm journaled in the recess and adapted to swing horizontally upon a vertical axis, a cylinder having a piston whose rod is connected to a crank arm projecting from said arm's journal, means for supplying air under pressure to the cylinder, a support arranged in one end of the recess, means carried by the support for holding the tail of a torpedo, a cylinder having a piston whose rod is adapted to release the torpedo holding means, and means for admitting air under pressure to the cylinder of the support to release and expel the torpedo from the vessel when the torpedo is moved out of the recess.

35. A submergible vessel having a superstructure, a pocket or recess formed in the superstructure, arms for holding a torpedo in position within the recess, a cylinder having a piston whose rod projects through both ends of the cylinder and engages said arms to hold them in a locked position, a valve controlled pipe for supplying air under pressure to the cylinder, an arm journaled in the said recess and capable of a horizontal swinging movement, a crank arm extending from the journal of the horizontally swinging arm, a cylinder having a piston whose rod is connected to the crank arm, an exhaust port in the first mentioned cylinder which is connected to an inlet port of the second mentioned cylinder, a turning support engaging the tail of the torpedo, pneumatically operated means carried by the support for releasing the torpedo, and means operable by the movement of the support for controlling the admission of air to the said pneumatically operated means.

36. A submergible vessel having a superstructure, which is provided with a recess, arms pivoted in the recess for holding a torpedo, a cylinder having a piston whose rod is adapted to engage the said arms to hold them in engagement with the torpedo, a valve controlled pipe for supplying air under pressure to the said cylinder, an arm journaled in the lower side of the recess upon a vertically arranged shaft, a cylinder having a piston whose rod is connected to a crank arm extending from the said shaft, a pipe extending from an exhaust port arranged in the first mentioned cylinder and which is in advance of the normal position of the said piston and extends to an inlet port of the second mentioned piston, whereby when the first mentioned piston is operated to release the locking arms air will be admitted to the second cylinder to operate the swinging arm to push the torpedo out of the recess, a support for the tail of the torpedo, means carried by the support for releasing and projecting the torpedo from the vessel, and means for controlling the supply of air to the torpedo-releasing means.

37. A submergible vessel, having a superstructure the side of which is provided with a recess or pocket, a gimbal ring journaled in the recess or pocket and adapted to turn horizontally, a band pivoted to the ring and having rearwardly extending arms, a spring connecting said arms with arms extending from the ring, a cylinder carried by the band and having a piston whose rod extends through both heads of the cylinder, a cylinder formed integral with the first mentioned cylinder, a port connecting both cylinders, a lever pivoted to one end of the piston rod of the second mentioned cylinder and connected with the starter of the torpedo's propelling mechanism, clamping arms pivoted to the band and adapted to engage the tail of the torpedo, locking dogs for engaging the other ends of the arms, and means for controlling the admission of compressed air to the second mentioned cylinder for the purpose set forth.

38. A submergible vessel, having a superstructure the side of which is provided with a recess, a door for recess, means for opening and closing the door, a support journaled in one end of the recess and adapted to hold the tail of a torpedo, said support comprising a gimbal ring having a trunnion at its upper side and a hollow shaft extending from its underside in vertical alinement with the axis of the ring, a band journaled in the ring upon trunnions arranged in horizontal alinement with the axis of the ring, a cylinder carried by the band and having a piston rod operating therein, clamping arms pivoted to the band and adapted to engage the tail of the torpedo, locking dogs for engagement with the opposite ends of the said arms, a releasing lever pivoted to the piston rod and having a wire extending therefrom which is connected to the starting lever of the torpedo propelling mechanism, a second cylinder formed integral with the first cylinder and having an exhaust port which communicates with the first cylinder, a piston operating in the said cylinder the rod of which is connected to the releasing lever, a valve controlling the inlet to the lower end of the gimbal ring shaft, a rock shaft having an arm at each end one of which is adapted to engage the stem of the valve, a segment arranged adjacent to the shaft, a stop block adjustably carried by the segment and adapted to engage the arm at the opposite end of the rock shaft, and means for swinging the torpedo out of the recess and thereby turning the gimbal ring upon its axis to open the valve and admit air under pressure to the second cylinder.

39. A submergible vessel, having a superstructure, a recess or pocket formed therein, a door for the recess, means for opening and closing the door, a support arranged in one end of the recess and adapted for holding the torpedo, said support comprising a gimbal ring having a vertical axis, a hollow shaft coaxial with the gimbal ring and extending downwardly into the hull of the vessel, a band journaled in bearings arranged in horizontal alinement with the axis of the ring, clamping arms carried by the band for engagement with the tail of the torpedo, locking dogs for engagement with the opposite ends of the arms, a cylinder carried by the band and having a piston whose rod extends through both ends of the cylinder and terminates at each end in a head, a lever pivoted to one end of the rod, a wire connecting the opposite end of the lever with the torpedo starting mechanism, a cylinder formed integral with the first mentioned cylinder, a piston operating therein and normally arranged over a port that communicates with the adjacent cylinder, a rod extending from the said piston and connected to the said lever, a valve arranged at the inner end of the hollow shaft, a rock shaft having an arm which engages the stem of the valve, a second arm extending from the rock shaft, a segment having a stop block which is adapted to engage the second arm, a pipe for supplying air under pressure to the hollow shaft when the valve is opened, and means for swinging the torpedo within the recess whereby the valve will be opened and the torpedo released and projected from the vessel.

40. A submergible vessel, having a superstructure provided with a recess, a door for the recess, means for opening and closing the door, arms for holding a torpedo in the recess, means for releasing the arms, a support arranged in one end of the recess and adapted to hold the tail of the torpedo, said support comprising a gimbal ring having vertically arranged journals one of which is a hollow shaft and extends into the vessel, a compressed air supply pipe connected to the inner end of said hollow journal, a band horizontally journaled in said gimbal ring, arms pivoted to the band and adapted to engage the tail of the torpedo, locking dogs engaging the opposite ends of the arms, a cylinder connected to the band, a piston operating therein and having its rod projecting through both ends of the cylinder, one end engaging the dogs and the opposite end engaging the torpedo, a second cylinder cast integral with the first cylinder, a port establishing communication between the cylinders, a piston operating in the second cylinder and having its rod extending through the rear end thereof, a lever pivoted at one end of the piston rod of the first mentioned cylinder and intermediate its ends to the piston rod extending from the second mentioned cylinder, a wire connecting the lever with the torpedo starting mechanism, a flexible pipe extending from the hollow journal to an inlet port formed in the second mentioned cylinder, a valve controlling the inner end of the hollow journal, a segment surrounding the hollow shaft, a stop block adjustably carried by the segment, a rock shaft having an arm at its lower end which is adapted to engage the stop block and an arm beveled on its lower surface to engage the stem of the valve, and means for moving the torpedo out of the recess, whereby at a predetermined point of its movement the valve will be opened and air admitted to the cylinders to first release the starting mechanism of the torpedo, then release the torpedo and finally eject it from the support.

In testimony whereof I have hereunto set my hand this 30 day of October A. D. 1907.

SIMON LAKE.

Witnesses:
M. D. BLONDEL,
H. D. JAMESON.